US008294853B2

(12) United States Patent
Matsushita (10) Patent No.: US 8,294,853 B2
(45) Date of Patent: Oct. 23, 2012

(54) COLOR FILTER WITH OPTICAL TRANSMISSIVE STEP-FORMING LAYER AND ITS MANUFACTURING METHOD, AND A LIQUID CRYSTAL DISPLAY DEVICE USING THE COLOR FILTER

(75) Inventor: Yasuhiro Matsushita, Tokyo (JP)

(73) Assignee: TPO Hong Kong Holding Limited Corp., Shatin (HK)

( * ) Notice: Subject to any disclaimer, the term of this patent is extended or adjusted under 35 U.S.C. 154(b) by 1437 days.

(21) Appl. No.: 11/632,182

(22) PCT Filed: Jul. 14, 2005

(86) PCT No.: PCT/IB2005/052333
§ 371 (c)(1),
(2), (4) Date: Jan. 16, 2007

(87) PCT Pub. No.: WO2006/008708
PCT Pub. Date: Jan. 26, 2006

(65) Prior Publication Data
US 2008/0030658 A1 Feb. 7, 2008

(30) Foreign Application Priority Data
Jul. 16, 2004 (JP) .................. 2004-210057

(51) Int. Cl.
*G02F 1/1335* (2006.01)
*G09G 3/36* (2006.01)
(52) U.S. Cl. ........ 349/106; 349/107; 349/108; 349/109; 349/113; 349/114; 345/88

(58) Field of Classification Search .......... 349/106–109, 349/113–114; 345/88
See application file for complete search history.

(56) References Cited

U.S. PATENT DOCUMENTS

| 6,246,457 B1 * | 6/2001 | Kobayashi ............ 349/106 |
| 6,630,274 B1 | 10/2003 | Kiguchi | |
| 2001/0004276 A1 | 6/2001 | Urabe et al. | |

(Continued)

FOREIGN PATENT DOCUMENTS

EP        1109053        6/2001

(Continued)

OTHER PUBLICATIONS

PCT International Search Report of Counterpart PCT Application No. PCT/IB2005/052333.

*Primary Examiner* — Hoan C Nguyen
(74) *Attorney, Agent, or Firm* — Liu & Liu (57) ABSTRACT

An object of the invention is to accurately and easily manufacture a color filter. A method of manufacturing a color filter comprises: a first step of forming a first rib (220) forming a light shield layer and a second rib (230) having a smaller height than the first rib (220) in pattern on a base layer (1) by means of a photolithography method; a second step of forming a step-forming layer (4) by dripping an optical transmissive material into an area defined by the first and second ribs (220, 230) by means of ink-jet technique; and a third step of forming a coloring layer by dripping an optical coloring material (5) into an area defined by the first rib (220) by means of ink-jet technique after forming the step-forming layer (4).

20 Claims, 8 Drawing Sheets

U.S. PATENT DOCUMENTS

| | | | |
|---|---|---|---|
| 2002/0018159 A1* | 2/2002 | Kim et al. | 349/106 |
| 2003/0063239 A1 | 4/2003 | Suzuki | |
| 2003/0179327 A1* | 9/2003 | Nonaka et al. | 349/106 |
| 2003/0224255 A1 | 12/2003 | Fujimori | |
| 2004/0038138 A1* | 2/2004 | Kiguchi et al. | 430/7 |

FOREIGN PATENT DOCUMENTS

| | | |
|---|---|---|
| JP | 2003084122 | 3/2003 |
| JP | 2003-121635 | 4/2003 |
| JP | 2003-240939 | 8/2003 |

* cited by examiner

COLOR FILTER WITH OPTICAL TRANSMISSIVE STEP-FORMING LAYER AND ITS MANUFACTURING METHOD, AND A LIQUID CRYSTAL DISPLAY DEVICE USING THE COLOR FILTER

TECHNICAL FIELD

The present invention relates to a color filter and a display device using it. The invention also relates to a manufacturing method for them. The invention particularly relates to a color filter suitable to a transflective type liquid crystal display device having a transmissive area and a reflective area for each pixel or each predetermined unit displaying area, and to a manufacturing method for the color filter.

BACKGROUND ART

There is a conventionally known color filter handling a first light ray and a second light ray. The first light ray has a uni-directional optical path in which incident light from one principal surface side of the color filter passes through the filter only once to be colored and is guided to the other principal surface side. The second light ray has a bidirectional optical path in which incident light from the other principal surface side of the color filter passes through the filter to be colored, and the transmitted light ray is reflected by a light reflective element or the like disposed on the one principal surface side to enter the filter again and pass to be colored, and returns to the other principal surface side. This color filter is used for a so-called transflective type liquid crystal display device which applies optical modulation to external light incident from the front side according to an image to be displayed, and at the same time reflects and guides the light to the front side, while applying optical modulation to the incident light from a backlight system from the rear side according to an image to be displayed likewise, and at the same time making this light to be passed and guided to the same front side. This type of liquid crystal display device effectively displays images principally using external light (ambient light) when the operating environment is bright (reflective mode) and principally using self-emitted light of the backlight system (transmissive mode) when the operating environment is dark.

Such a transflective type liquid crystal display device is disclosed in Non-Patent Document 1 etc. In this device, each pixel electrode is divided into a reflective area and a transmissive area. The reflective area is a reflective electrode part made of aluminum coated on an acrylic resin having an uneven surface, while the transmissive area is a transparent electrode part made of ITO (indium tin oxide) having a flat surface. Furthermore, the transmissive area is placed in the center of one rectangular pixel area and has a rectangular shape substantially analogous to the pixel area, while the reflective area is a part of the pixel area other than the rectangular transmissive area and has a shape surrounding this rectangular transmissive area. Such a pixel structure etc. is intended to improve legibility.

However, in this known liquid crystal display device, the transmissive area and the reflective area are different in color purity of the displayed color are though these areas are in the same pixel area. This is attributable to the fact that the light from the backlight system and the external light which have different optical paths are colored in the same way, which leads to deterioration of quality of the displayed colors over a display screen.

One such patent application of an invention to solve such a problem is Patent Document 1 filed by the same applicant as that of the present application. The color filter according to this Document is a color filter which colors first light having a uni-directional optical path and second light having a bidirectional optical path for each pixel, and which includes a first coloring part for coloring the first light and a second coloring part for coloring the second light, the first and second coloring parts having different thicknesses. Furthermore, the color filter which colors the first light having a uni-directional optical path and the second light having a bidirectional optical path for each pixel is arranged to be comprised of: a step-forming layer which can be supported by a base layer and is made of an optical transmissive material patterned so as to form at least one concave section having a bottom face of predetermined shape corresponding to an area to transmit the first light and a wall face of a predetermined height in a pixel; and a coloring layer deposited on the step-forming layer and the concave section for coloring the first and second light.

According to this, since the first coloring part and the portion of the coloring layer in the area of the bottom face can be made thicker than the portion of the coloring layer (second coloring part) in other areas, it is possible to have a relatively large coloring effect on the first light having the uni-directional optical path, namely, the first light that can be subjected to coloring effect only once, and to have a relatively small coloring effect on the second light having the bidirectional optical path, namely, the second light that can be subjected to coloring effect twice. This makes it possible to reproduce colors of the first light and second light at a uniform color purity within a pixel and thereby improve the quality of color display over the screen.

[Non-Patent Document 1]
M. Kubo, et al. 'Development of Advanced TFT with Good Legibility under Any Intensity of Ambient Light', IDW'99, Proceedings of The Sixth International Display Workshops, AMD3-4, page 183-186, Dec. 1, 1999, sponsored by ITE and SID

[Patent Document 1]
Japanese Patent Application Laid-Open No. 2003-84122 (particularly, see FIG. 3 and claims, and paragraphs [0009], [0010] and [0030] to [0039])

DISCLOSURE OF INVENTION

Technical Problem

The above-mentioned prior arts have a principal objective to propose a structure for establishing color balance within a pixel and do not specifically disclose how simply a color filter having such a structure can be manufactured. In addition, despite the fact that the pixel structure is more complicated and the manufacturing process is more complicated to realize the color balance, no consideration is given to the simplification of manufacturing processes from the standpoint of actual costs and yield, etc.

On the other hand, it has been mainstream to carry out processes based on a photolithography method for patterning of a black matrix and coloring parts of red (R), green (G), blue (B) as basic colors in a color filter. This is because such a black matrix and coloring parts have very fine shapes and especially the shapes of a color filter used for a display panel used for a portable device such as cellular phone require extremely high precision. However, the manufacture using a photolithography method requires many processes and photomasks and involves disadvantages in simplifying the overall manufacturing processing.

(Object)

The present invention has been implemented in view of the above-described circumstances and its object is to provide a manufacturing method in which a color filter having a known structure can be easily made, and to provide a color filter made by the manufacturing method.

It is another object of the invention to provide a manufacturing method in which a color filter suitable for a transflective type liquid crystal display device provided with a transmissive area and a reflective area for each pixel or each predetermined unit displaying area can be made in fewer processes and at lower cost, and to provide a color filter made by the manufacturing method.

It is a further object of the invention to provide a color filter manufacturing method capable of reducing manufacturing cost and providing high yield, and to provide a color filter made by the manufacturing method.

Furthermore, it is a still further object of the invention to provide a liquid crystal display device suitable for using the color filter which attains the above-mentioned objects.

Technical Solution

In order to attain the above-mentioned objects, a first aspect of the present invention is a method of manufacturing a color filter, comprising: a first step of forming a first rib and a second rib having a smaller height than the first rib in pattern on or above a base layer by means of a photolithography method; a second step of forming a step-forming layer by dripping an optical transmissive material into an area defined by the first and second ribs by means of inkjet technique; and a third step of forming a coloring layer by dripping an optical coloring material into an area defined by the first rib by means of ink-jet technique after forming the step-forming layer.

By doing so, the step-forming layer and coloring layer are formed by means of ink-jet technique, and therefore the overall manufacturing processes are simplified. Moreover, the initially created first and second ribs prevent as dams the material dripped by the ink-jet from flowing out of the ribs and therefore the dripping operation of the ink-jet does not require very high accuracy, and it is nevertheless possible to accurately pattern the step-forming layer and coloring layer into a desired shape.

This aspect may further comprise: a preceding step of depositing a light shield material on the base layer prior to the first step; and an etching step of forming a light shield layer under the first and second ribs by applying an etching process to the light shield material using the first and second ribs as a mask posterior to the first step. This allows a light shield layer and ribs to be formed with a relatively plain material.

Furthermore, the first and second ribs may be formed in the same process in a photolithography method using a halftone mask in the first step. This allows the first and second ribs to be formed simultaneously and further simplifies the manufacturing processes.

Furthermore, the areas defined by the first and second ribs into which the optical transmissive material may be dripped are arranged in form of a straight line on a principal surface of the base layer to form a plurality of line regions, and in the second step, at least one ink-jet head may be made to be displaced along a longitudinal extending direction of the line region with its jetting outlet being faced to the line region while the dripping of the optical transmissive material is performed for each of the line regions. This simplifies movement control of the ink-jet head in the dripping operation, further simplifies the manufacturing processes and achieves efficient manufacturing. In addition, the areas defined by the first rib into which the optical coloring material is dripped may be arranged in form of a straight line on a principal surface of the base layer to form a plurality of line regions, and in the third step, at least one ink-jet head may be made to be displaced along a longitudinal extending direction of the line region with its jetting outlet being faced to the line region while the dripping of the optical coloring material is performed for each of the line regions, which further simplifies the control.

In order to attain the above-mentioned objects, a second aspect of the present invention is a method of manufacturing a color filter, comprising: a first step of forming an optical transmissive step-forming layer including a first part forming a pixel boundary and a second part having a smaller height than the first part in pattern on or above a base layer by means of a photolithography method; and a second step of forming a coloring layer by dripping an optical coloring material into an area defined by the first part by means of ink-jet technique after forming the step-forming layer.

This method also forms the step-forming layer and coloring layer based on the ink-jet technique, and so simplifies the overall manufacturing processes, wherein the initially created step-forming layer prevents as a dam the material dripped by the ink-jet from flowing out of the outer edges of the layer. This aspect is suitable for manufacturing of a black-matrix-less color filter, while it can further omit a process using the ink-jet compared to the first aspect and further simplify the manufacturing.

In this aspect, the first and second parts may be formed in the same process in a photolithography method using a halftone mask in the first step, or the areas defined by the first part into which the optical transmissive material is dripped may be arranged in form of a straight line on a principal surface of the base layer to form a plurality of line regions, and in the second step, at least one ink-jet head may be made to be displaced along a longitudinal extending direction of the line region with its jetting outlet being faced to the line region while the dripping of the optical coloring material is performed for each of the line regions. Their advantages are the same as those described in the first aspect.

A further aspect of the present invention is a color filter comprising: an optically transmissive base layer; a first rib and a second rib provided on the base layer in pattern, the second rib having a smaller height than the first rib; an optically transmissive step-forming layer formed in an area defined by the first and second ribs; and a coloring layer formed in an area defined by the first rib. Here, the corresponding light shield layers may be formed under the first and second ribs. Alternatively, it is also a color filter comprising: an optically transmissive base layer; an optically transmissive step-forming layer including a first part and a second part provided on the base layer in pattern, the first part forming a pixel boundary, the second part having a smaller height than the first portion; and a coloring layer formed in an area defined by the first part. These offer the structures for leading the respective advantages of the first and second aspects.

A yet further aspect of the present invention is a liquid crystal display device using a color filter as a result of each of the above-mentioned aspects, wherein the color filter is provided on one substrate of the liquid crystal display device; the other substrate is provided with pixel electrodes comprising a transmissive electrode part and a reflective electrode part; and an area of the step-forming layer in the color filter is aligned with the reflective electrode part and the other area in the color filter is aligned with the transmissive electrode part. This provides a device possessing the above-mentioned various advantages.

Preferably, the above-mentioned optical transmissive material is not an ordinary coloring material at the minimum requirements, and more specifically, transparent or non-coloring material. In this way, there is an advantage in that a coloring layer with different thicknesses can be formed by performing a dripping process of the originally adopted coloring material only once after forming the step-forming layer.

BEST MODE

With reference now to the attached drawings, implementation modes of the present invention including the above-described aspects and more will be described in more detail by way of embodiments.

Embodiment 1

Figure 1:
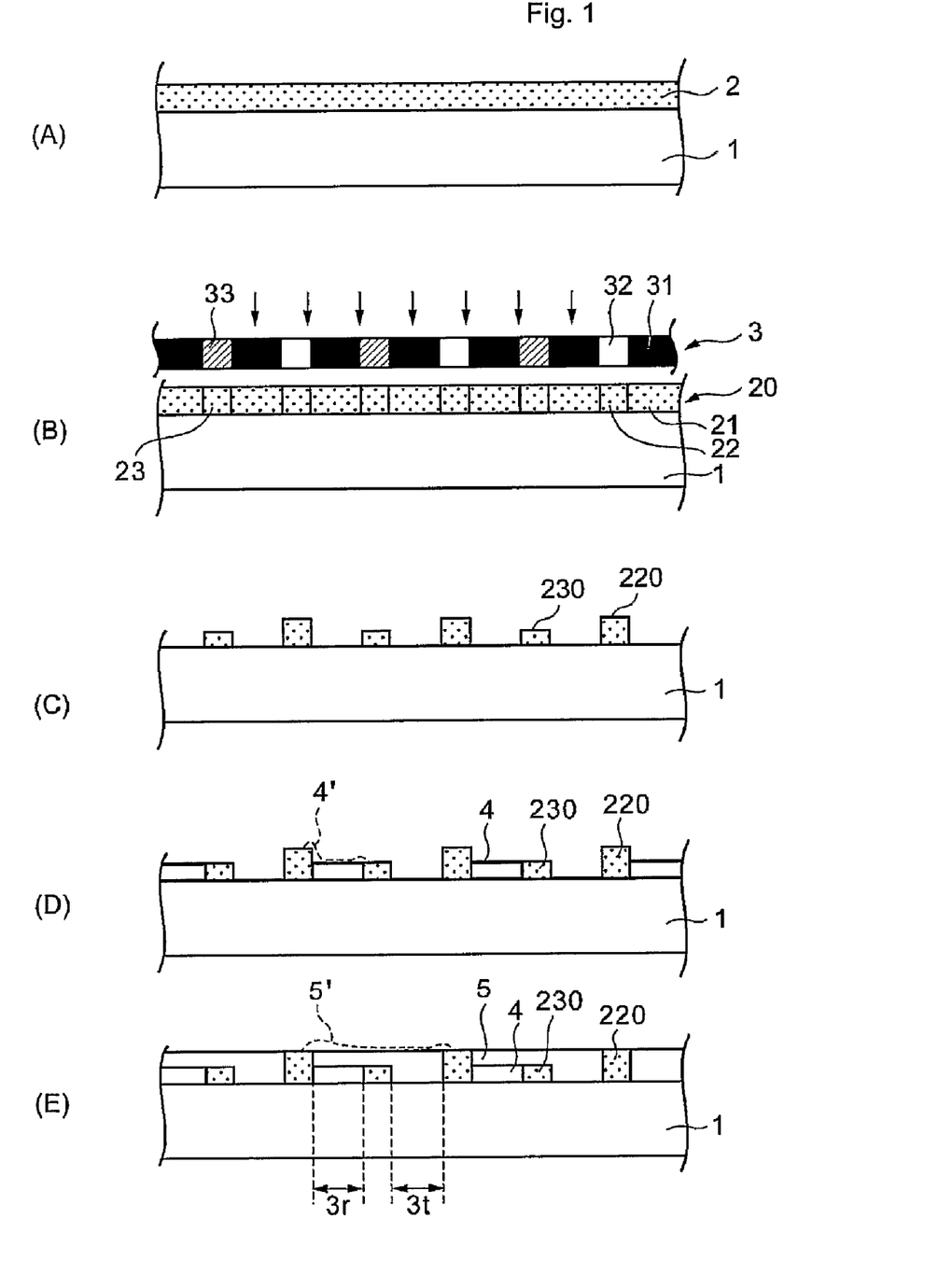
FIG. 1 is a cross sectional views generally showing structures of a color filter in steps of a color filter manufacturing method according to one embodiment of the invention.

FIG. 1 shows schematic cross sectional structures of a color filter in steps of a color filter manufacturing method according to one embodiment of the invention.

In this manufacturing method, a glass substrate 1 is prepared as a base layer first and then subjected to necessary processes such as cleaning, and a material 2 for forming a black matrix (or black mask) as a light shield layer is deposited on the glass substrate 1. This situation is shown in (A) of FIG. 1. A transparent or optical transmissive synthetic resin substrate etc. is substitutable for the glass substrate 1. The material 2 is selected from materials of types suitable for a photolithography method to which the manufacturing method of this embodiment belongs or color resist method, for which a color resist material obtained by diffusing atomized pigments (here, black pigments) in photosensitive resin is used. More specifically, acrylic base black photoresist or the like can be used. Depositing of the material 2 onto the substrate 1 can be performed by slit coating, sputtering or various printing methods, etc. After such deposition, the substrate is heated for approximately 1 to 3 minutes to 70° C. to 100° C. through a so-called prebake process to harden or stabilize the material 2.

Then, the photomask 3 is overlaid on the substrate from above the material 2, and an exposure process is performed. (B) of FIG. 1 shows this situation. The photomask 3 is a so-called halftone mask and patterned with three types of portions, in this example, a first one of which is a part 31 which almost completely shields light used in the exposure process and a second one is a part 32 through which the light is passed almost completely. A third part 33 lets the light pass at a predetermined intermediate transmittance of around 50%, in this embodiment 10% to 30%. When light is applied onto the material 2 through such a photomask 3, the material 2 is photosensitized in correspondence with the first to third parts 31 to 33, a pattern of the photomask 3 is transferred to the material 2, which causes the material 2 to become a layer 20 whose material characteristics are changed locally. In the layer 20, part 21, part 22 and part 23 are formed which correspond to the first part 31, second part 32 and third part 33 of the photomask 3, respectively.

Figure 2:
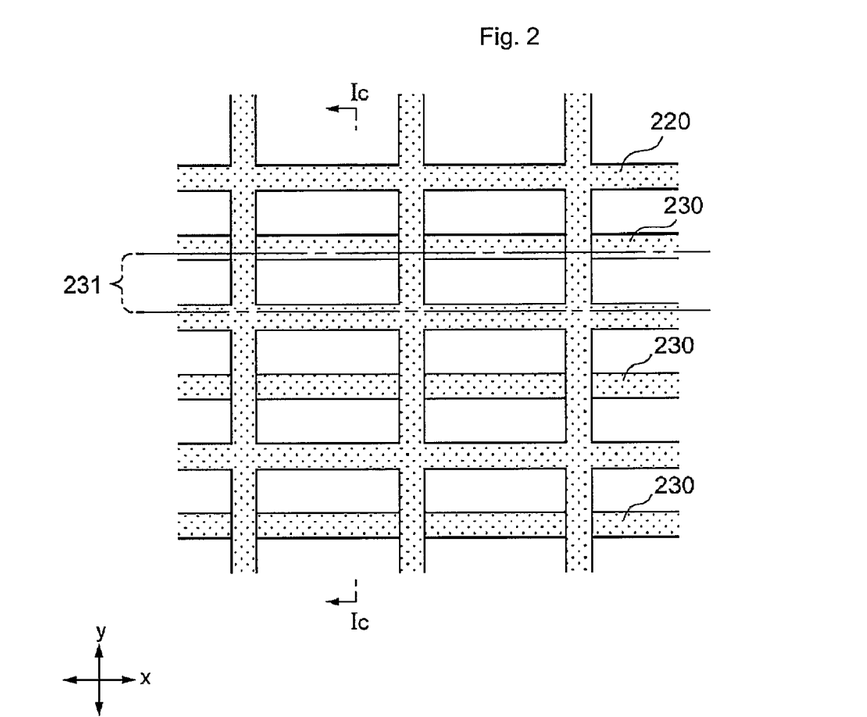
FIG. 2 is a schematic plan view of the color filter in the step of (C) of FIG. 1.

Next, a developing process is carried out with a predetermined developing solution, followed by a fixing process such as thermal treatment, whereby the entire first part 21 of the layer 20 is removed and the third part 23 remains approximately half the height and the other is removed. The second part 22 has been sufficiently irradiated with light to become dissolution-resistant to the developer, and so remains keeping substantially the same height of the original layer 20. As a result, as shown in (C) of FIG. 1, ribs 220, 230 formed of the material 2 are patterned having two types of heights. A plan view corresponding to the figure (C) is shown in FIG. 2.

The first rib 220 forms a black matrix and the area enclosed by the rib 220 corresponds to a pixel area for each of basic colors red (R), green (G) and blue (B) in this example. As shown in FIG. 2, the pixel area defined by the rib 220 is rectangular and all the vertically aligned pixel areas in the figure are for the same basic color. The second rib 230 is formed inside such a pixel area, and in this embodiment the second rib 230 is patterned in such a form that each pixel area is divided into upper and lower parts and the rib 230 runs through the middle of the pixel area in the horizontal direction.

Figure 3:
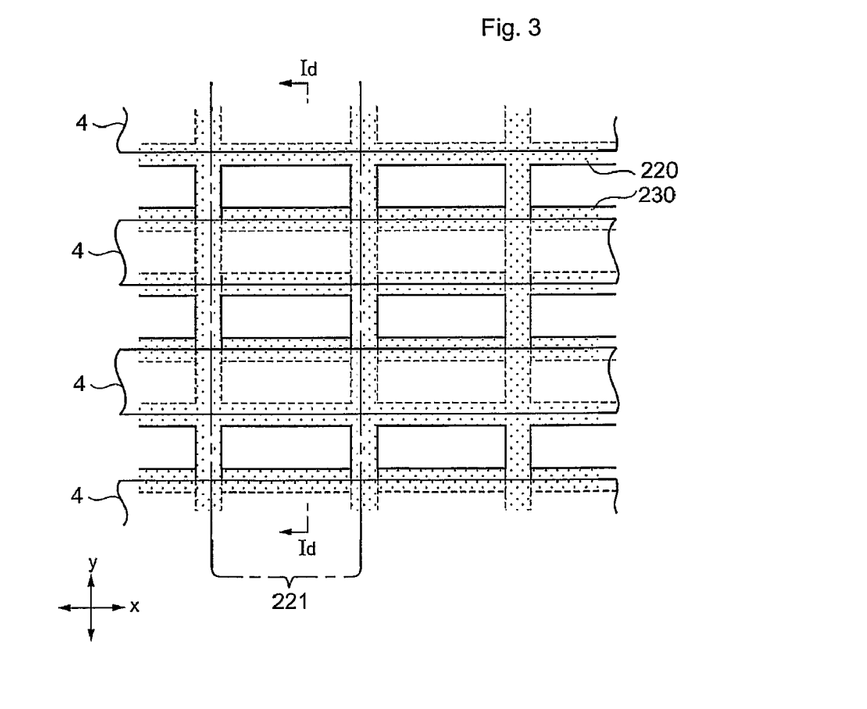
FIG. 3 is a schematic plan view of the color filter in the step of (D) of FIG. 1.

After the first and second ribs 220, 230 are thus formed through the processes according to a photolithography method, the process goes to the next step as shown in (D) of FIG. 1, where a process of forming a step-forming layer using an ink-jet method is performed. This process is carried out by jetting a transparent liquid ink material 4 for forming the step-forming layer from an ink-jet head (described later) and dripping it into an area defined by the first rib 220 and second rib 230. More specifically, the jetting outlet of the ink-jet head is faced to a longitudinal area in form of a straight line or ling area, (hereinafter referred to as 'row area') 231 formed of respective areas defined by the ribs 220, 230, the defined areas being lined up in the horizontal direction, as shown by a single-dot dashed line in FIG. 2, and the ink material 4 is jetted while the head is made to move along a longitudinal extending direction x (left-to-right direction in FIG. 2) of the row area and the ink material 4 is dripped continuously into the row area in such a way as to draw a straight line from left to right, for example. When only one such head is used, the movement of the head is controlled so that the ink material is dripped into row areas sequentially one by one from an upper row area 231 to a lower row area 231 on a principal surface of the color filter. Preferably, a plurality of heads are provided and the ink material is dripped into a plurality of row areas simultaneously to realize efficient manufacturing. In the ink-jet method, it is relatively easy to adopt a multi-head configuration, which is convenient in such a case. FIG. 3 shows how the ink material 4 is dripped into each row area 231 and it is seen that the ink material 4 is formed in shape of a horizontal straight line in such a way as to overlap some parts of the rib 220, longitudinally extending and to skip those parts in succession.

It is seen from FIG. 3 that the ink material 4 is deposited in form of slightly sticking out of the upper and lower edges of the ribs, but such sticking out (the ink material immediately after the dripping is depicted with a reference numeral 4' in FIG. 1(D)) immediately after the dripping can be ignored in some degree. This is because the ink material 4' is subjected to heat treatment, etc., and shrunken in the subsequent steps, and it is thereby possible to finally deform, that is, settle the most part of the ink material 4' into a desired shape of substantially the same height as the rib 230 and the ink material adhered to the top of the rib also becomes sufficiently thin so that the thickness of the adherent ink is suppressed to the extent of no problem. The extent of such sticking out and shrinkage can be optimized using various ink material characteristics and dripping parameters.

As the ink material 4, it is possible to use a material exhibiting stable fluidity without clogging the nozzle of the ink-jet head. In this embodiment, the step-forming layer is formed in the ink-jet method as described above, and so it has an aspect that no photosensitive material is required and has an advantage that there is no waste of the layer material unlike the conventional process in a photolithography method.

Figure 4:
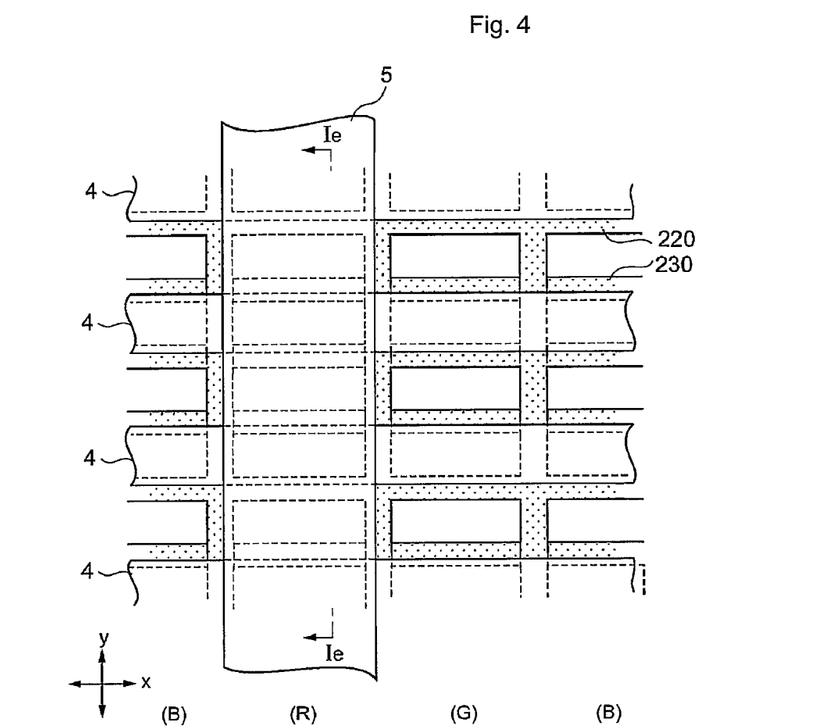
FIG. 4 is a schematic plan view of the color filter in the step of (E) of FIG. 1.

After the step-forming layer is formed, the process goes to a step in the final stage as shown in (E) of FIG. 1 to perform a process of forming a coloring layer using the ink-jet method. This process is carried out by jetting an optical coloring liquid ink material 5 of any one of R, G, B for forming the coloring layer from the ink-jet head and dripping it into the area defined by the first rib 220. More specifically, the jetting outlet of the ink-jet head is faced to a longitudinal area in form of a straight line or line area (hereinafter referred to as 'column area') 221, formed of the respective areas defined by the ribs 220, the defined areas being lined up vertically, as shown by a single-dot dashed line in FIG. 3, and the ink material 5 is jetted out while the head is made to move along a longitudinal extending direction y (vertical direction in FIG. 3) of the column area and the ink material 5 is continuously dripped into the column area in such a way as to describe a straight line from top to bottom, for example. When only one such head is used, the movement of the head is controlled so that the ink material is dripped into column areas one by one sequentially from a left column area 221 to a right column area 221 on a principal surface of the color filter. FIG. 4 shows how the ink material 5 of red (R) is dripped into one column area 221 and it is seen that the ink material 5 is formed in shape of a straight line in such a way as to overlap some horizontally extending parts of the rib 220 and rib 230 and to skip these parts in succession. After the dripping, the ink material 5 is subjected to heat treatment for stabilization as with the ink material 4.

By carrying out the above-described ink-jet process and heat treatment of the ink material 5 as a material corresponding to a color to be processed is used for the material 5 for each of colors R, G, B, it is possible to complete all the coloring layers based on the ink material 5. For the structure shown in (E) of FIG. 1, it is further possible to form a transparent or optical transmissive protective layer on the coloring layers and cover them. This makes it possible to obtain a stronger and more reliable color filter.

FIG. 4 shows the ink material 5 deposited slightly sticking out of the left and right edges of the rib, but as in the case of the above-described ink material 4, the extent of such sticking out (the ink material immediately after the dripping is depicted with a reference numeral 5' in FIG. 1(E)) and the shrinkage of the ink material 5 can be optimized to settle the ink material 5 to a final desired shape.

The specific material of the ink material 5 also requires conditions similar to those of the ink material 4, but unlike the ink material 4, it must have an optical coloring characteristic eventually in order to form a coloring layer. For this reason, a material mixed with pigments or dye particles e.g. of R, G or B basic colors is used for the ink material 5, and therefore special consideration (e.g., diameter of particles) should be given so that these mixing substances do not cause clogging in the nozzle (or jetting outlet) of the ink-jet header. In order to simply avoid such consideration, it is preferable to use a high fluidity dye of the basic color as the ink material 5.

As shown in (E) of FIG. 1, the color filter created finally in this way has a reflective area $3r$ handling the aforementioned second light corresponding to the step-forming layer 4 and a transmissive area $3t$ which is the area other than the reflective area $3r$ and handles the first light. Furthermore, the color filter has a form in which oblong coloring parts of R, G, B basic colors are arranged sequentially repeated, and use may be made with the vertical direction of the display screen of the applied device corresponding to the x direction.

Figure 5:
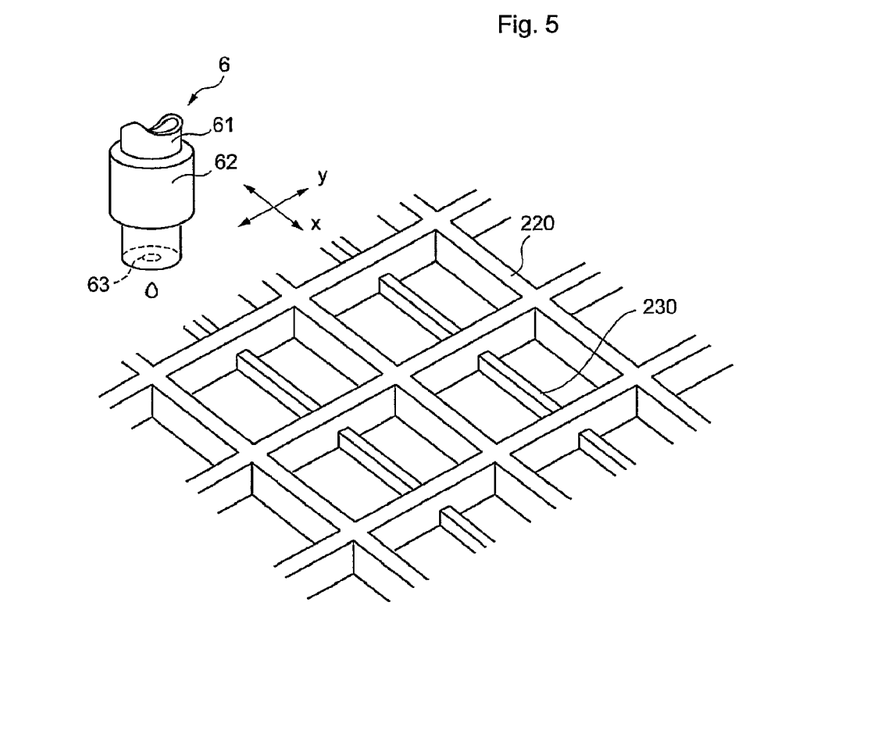
FIG. 5 is a schematic perspective view showing relationship between a substrate in which different ribs are formed and an ink-jet head.

In order to describe the configuration of the ink-jet device and movement control of the ink-jet head more specifically, FIG. 5 is referred first.

FIG. 5 is a schematic perspective view showing relationship between a substrate in which ribs 220, 230 are formed and an ink-jet head. In this figure, an ink-jet head 6 is principally composed of a cylindrical body 61 provided with a flexible part and a piezoelectric element 62 provided on the flexible part. An opening 63 is formed as a jetting outlet at an end of the cylindrical body 61 so that an ink liquid from an ink chamber provided in the cylindrical body 61 is jetted from this opening 63. The jetting mechanism is in principle based on a pressure to the ink chamber by the piezoelectric element 62, which is well known per se, and so will not be detailed here. This embodiment adopts the configuration according to a piezoelectric conversion system, but it is also possible to adopt other on-demand type configuration such as a thermal conversion system or electrostatic suction system or continuous system type configuration. Detailed descriptions of these systems are in a book 'Ink-Jet Printer Technique and Material' (under the editorial supervision of Takeshi Amari, published by CMC Publishing Co., Ltd., first edition published on Jul. 31, 1998), etc., and these documents are referenced.

The head 6 is placed so that its jetting outlet 63 faces the surface onto which the ink material is dripped, and the ink material 4 is dripped to the row area 23 as described above with the head being made to move along a longitudinal extending direction x of the area 231, whereas the ink material 5 is dripped to the column area 221 as described above with the head being made to move along a longitudinal extending direction y of the area 221. Incidentally, it is possible to change the ink-jet head to be used for each material to be dripped or to change the ink material to be applied and use a single ink-jet head.

Figure 6:
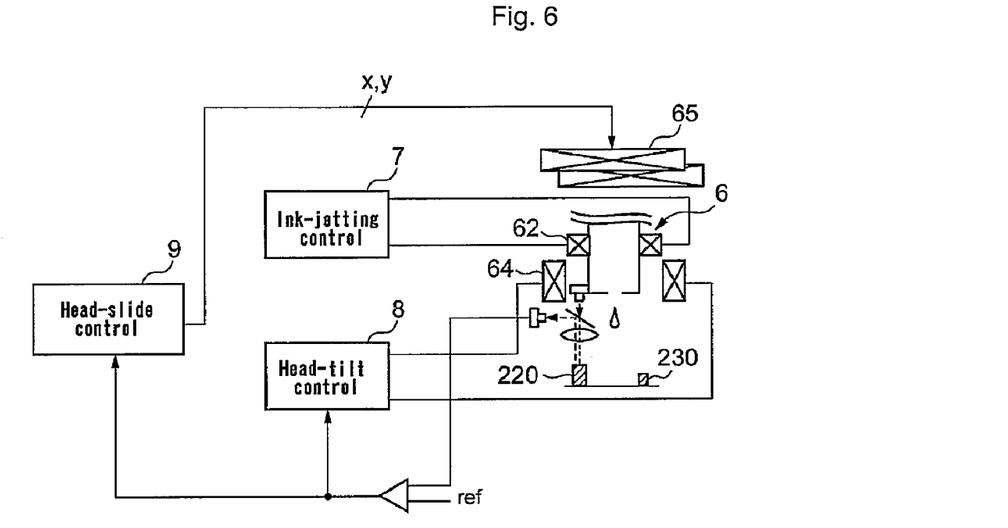
FIG. 6 is a block diagram showing a general configuration for performing displacement control on an ink-jet head.

FIG. 6 shows a general configuration for performing displacement control including movement control on the head 6 in the x and y directions.

In this figure, the head 6 is provided with not only the already described piezoelectric element 62 but also a transducer 64 for controlling the tilt of the head 6 and a slider system 65 for performing rectilinear movement of the entire head 6 over the principal surface of the substrate in the x and y directions. A control signal suitable for the piezoelectric element 62 is generated by an ink-jetting control circuit 7, and the piezoelectric element 62 performs movement such as flexure, expansion and contraction, twisting to deform the ink chamber as required in accordance with the control signal. A control signal suitable for the transducer 64 is generated by a head-tilt control circuit 8, and the transducer 64 drives the head 6 so as to change the tilt (directivity) of the head 6 from a neutral position according to the control signal. A control signal suitable for the slider system 65 is generated by the head-slide control circuit 9 and the slider system 65 moves the head 6 rectilinearly in the x and y directions according to the control signal.

The head 6 is further equipped with feedback means for control of position and directivity of the head, and is therefore provided with a laser diode attached to the head 6, a beam splitter for transmitting the emitted laser beam, an object lens for condensing the transmitted beam toward the jetting target surface and a photodiode receiving returned light caused by light reflected on the jetting target surface and passed through the object lens and beam splitter. The photoreception output of the photodiode is supplied to one input of a comparator and a reference signal ref is supplied to the other input of the comparator. The beam output from the object lens is applied onto, for example the rib 220 and when the head 6 is correctly oriented and correctly positioned, the amount of the returned light from the rib 220 and received at the photodiode is sufficiently small, and otherwise the amount of light received increases due to reflection of light from the surface, etc., of the substrate 1. Thus, the returned light corresponding to the position and orientation of the head 6 is detected by the photodiode. The comparator compares this detection output with the value of the reference signal ref and generates an error detection signal indicating the comparison result with respect to the reference signal ref. An error detection signal generated when the former is greater than the latter indicates that the head 6 is deviated from the appropriate orientation and position, and the head-tilt control circuit 8 and head-slide control circuit 9 perform control so as to correct the orientation and position according to or based on the error detection signal. Based on such a configuration, it is possible to correct the tilt and position of the head 6 so that the head 6 is not deviated from the desired dripping state during movement of the head 6 in the x and y directions for the dripping operation.

In this embodiment, during the dripping operation of the head 6, the ribs 220 and 230 stop the dripped liquid and prevent the dripped liquid from being out of the dripping area and space, and therefore this embodiment has an advantage of accurately forming a step-forming layer and coloring layer of a desired shape even if a positioning accuracy in the y direction during movement of the head 6 in the x direction and/or a positioning accuracy in the x direction during movement of the head 6 in the y direction and/is low. Therefore, it is possible to accurately form the step-forming layer and coloring layer of the desired shape through only autonomous positioning control of the head in the inkjet device (as long as the control is appropriate) without adopting the complete configuration with feedback applied to the position and tilt control as shown in FIG. 6.

Figure 7:
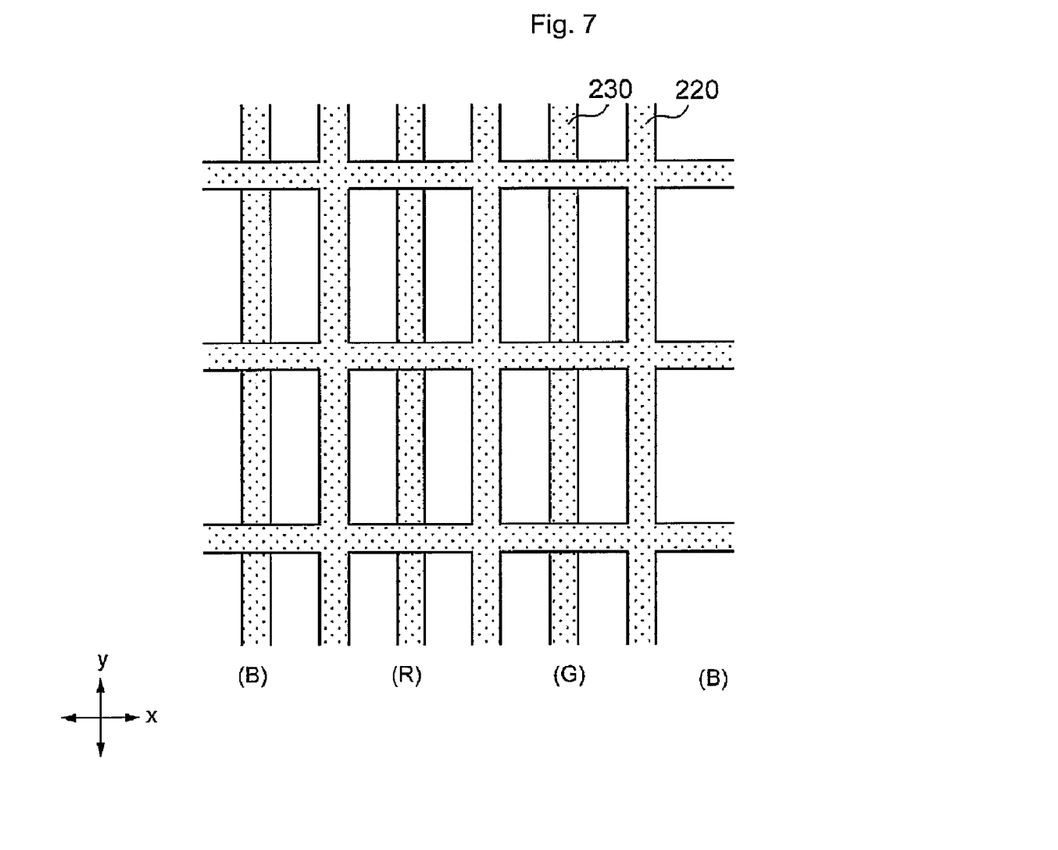
FIG. 7 is an illustration showing a modification according to the invention.

In this embodiment, substantially the lower half of the pixel area is designated as the area of the step-forming layer, but the area of the step-forming layer can be modified in various ways. It can also be in the upper part of the pixel area or the left or right side part. When the ribs 230 are arranged vertically so as to form the area of the step-forming layer on the left or right side, the rib formation is arranged as shown in FIG. 7 and the head 6 can be moved only in the y direction during a dripping operation for both the step-forming layer and coloring layer. This makes the control of the head 6 simpler, which in turn contributes to further simplification of the manufacturing steps.

In the above-described embodiment, the rib 230 is formed of the same material as that of the rib 220, and therefore the rib 230 can also function like the black matrix. This will be explained more specifically with reference to FIG. 8.

Figure 8:
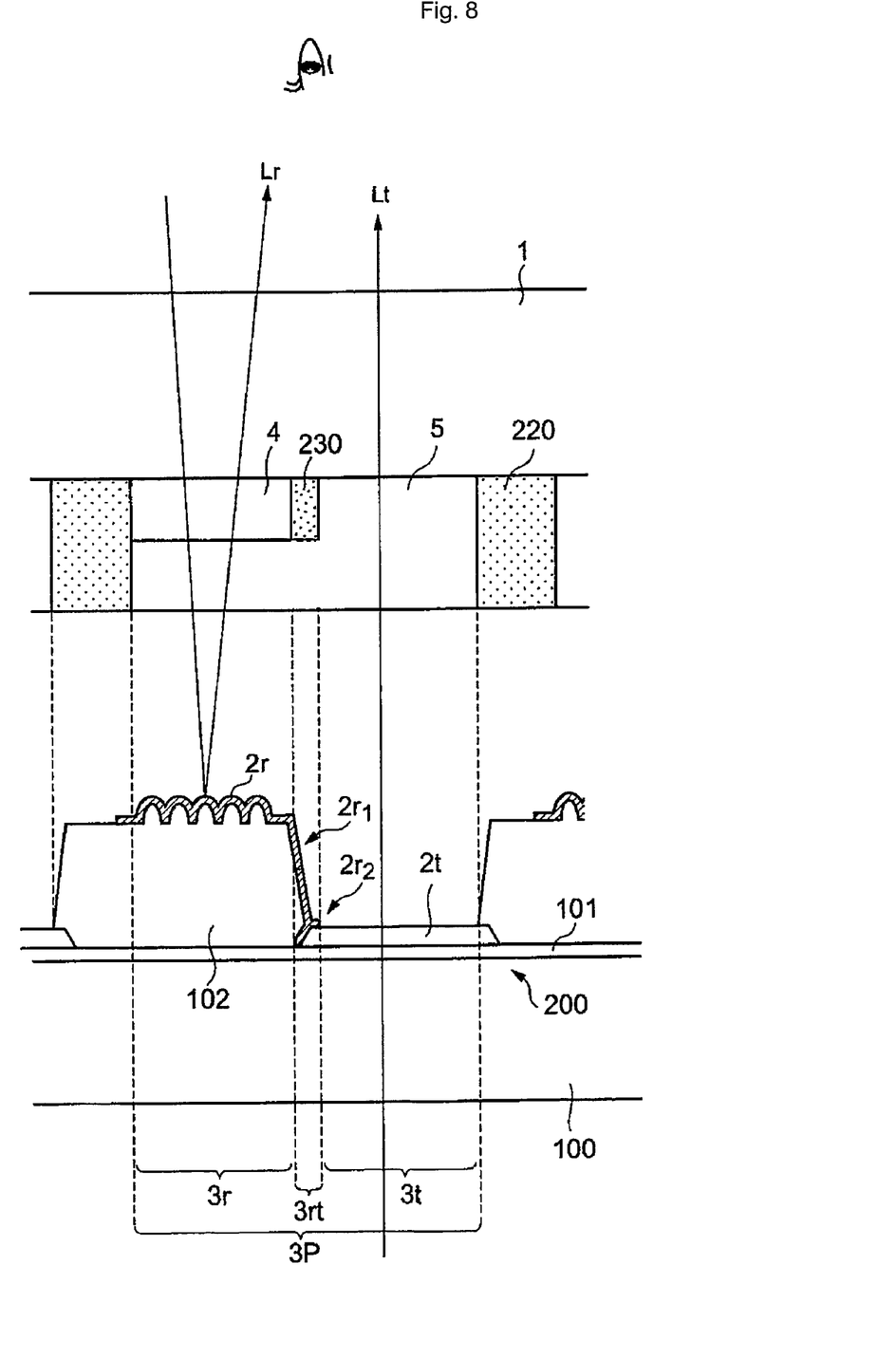
FIG. 8 is a cross sectional view showing a construction of a panel assembly having a structure of a pixel electrode of a liquid crystal display device and a substrate provided with a color filter according to an embodiment of the invention.

FIG. 8 shows the basic structure of a pixel electrode of the liquid crystal display device shown in the above-mentioned non-patent document and a color filter formation substrate according to this embodiment. A glass substrate 1 of the color filter formation substrate is placed on the front side of the display device and a rear substrate 100 provided with a pixel electrode 200 is combined with the glass substrate 1 in such a way as to face the substrate 1 and sandwich a liquid crystal layer (not shown) in between to form a panel assembly. The pixel electrode 200 is divided into a transparent electrode part 2*t* and a reflective electrode part 2*r*, and the transparent electrode part 2*t* is formed on an insulating film 101 which is a foundational layer formed on the substrate 100 and the reflective electrode part 2*r* is formed on a resin layer 102 which is additionally formed on the insulating film 101. The reflective electrode part 2*r* is positioned more inside the assembly than the transparent electrode part 2*t* due to the step formed of the resin layer 102, which makes the thickness of the liquid crystal layer in a reflective area 3*r* in a pixel area 3P substantially half the thickness of the liquid crystal layer in a transmissive area 3*t* so as to absorb the difference between the optical path of reflected light Lr in the liquid crystal layer and other necessary optical layers and the optical path of transmitted light Lt in the same. The reflective electrode part 2*r* is made of optical reflective metal and its surface is roughened to scatter the reflected light Lr.

The area of the step-forming layer 4 in the color filter is aligned with the reflective electrode part 2*r* and the other area is aligned with the reflective electrode part 2*t*.

In such a configuration, a transition area 3*rt* exists between the reflective area 3*r* and the transmissive area 3*t*, wherein an inclined part 2*r*1 of a metal material forming the reflective electrode part 2*r* and a metal material part 2*r*2 having substantially the same height as the transparent electrode part 2*t* are formed in the transition area 3*rt*. These parts 2*r*1, 2*r*2 also reflect incident light, but the reflected light conforms to neither of the above-described optical paths and there is no structure for compensating for the discrepancy in optical path in a section of this transition area 3*rt*. Therefore, the pixel electrode parts 2*r*1, 2*r*2 of this transition area 3*rt* produce inappropriate reflected light beyond the specifications of the reflective area 3*r* and transmissive area 3*t*, causing a reduction of contrast of displayed images, for example.

In contrast, this embodiment makes it possible to shield this inappropriate reflected light using the rib 230. The rib 230 can carry a so to speak second black mask added to the original black mask of the rib 220.

This embodiment forms the rib 230 and rib 220 using the halftone mask 3 at a time, but it is also possible to use a diffraction mask or the like having the similar function. Furthermore, this embodiment forms the rib 230 and rib 220 using the halftone mask 3 in the same step using the same material, but it is also possible to carry out steps in a photo-lithography method for each rib and form the rib 230 and rib 220 independently. Such a manner also offers and advantage specific to the present invention in the sense that the step-forming layer 4 and coloring layer 5 can be simply formed in an ink-jet technique without requiring any photomask.

Embodiment 2

Next, another embodiment of the present invention will be described with reference to FIG. 9. This manufacturing method can be said to be a modification example of the above Embodiment 1, and a glass substrate 1 is prepared again here and necessary processes such as cleaning are performed. However, in this embodiment, instead of forming a black matrix using ribs, a material BMo for forming a black matrix aside from the ribs is deposited on the glass substrate 1. This situation is shown in (A) of FIG. 9. That is, a black matrix is formed using chromium (Cr) or chromium oxide (CrO) conventionally widely used for a black matrix instead of a light shield rib.

Figure 9:
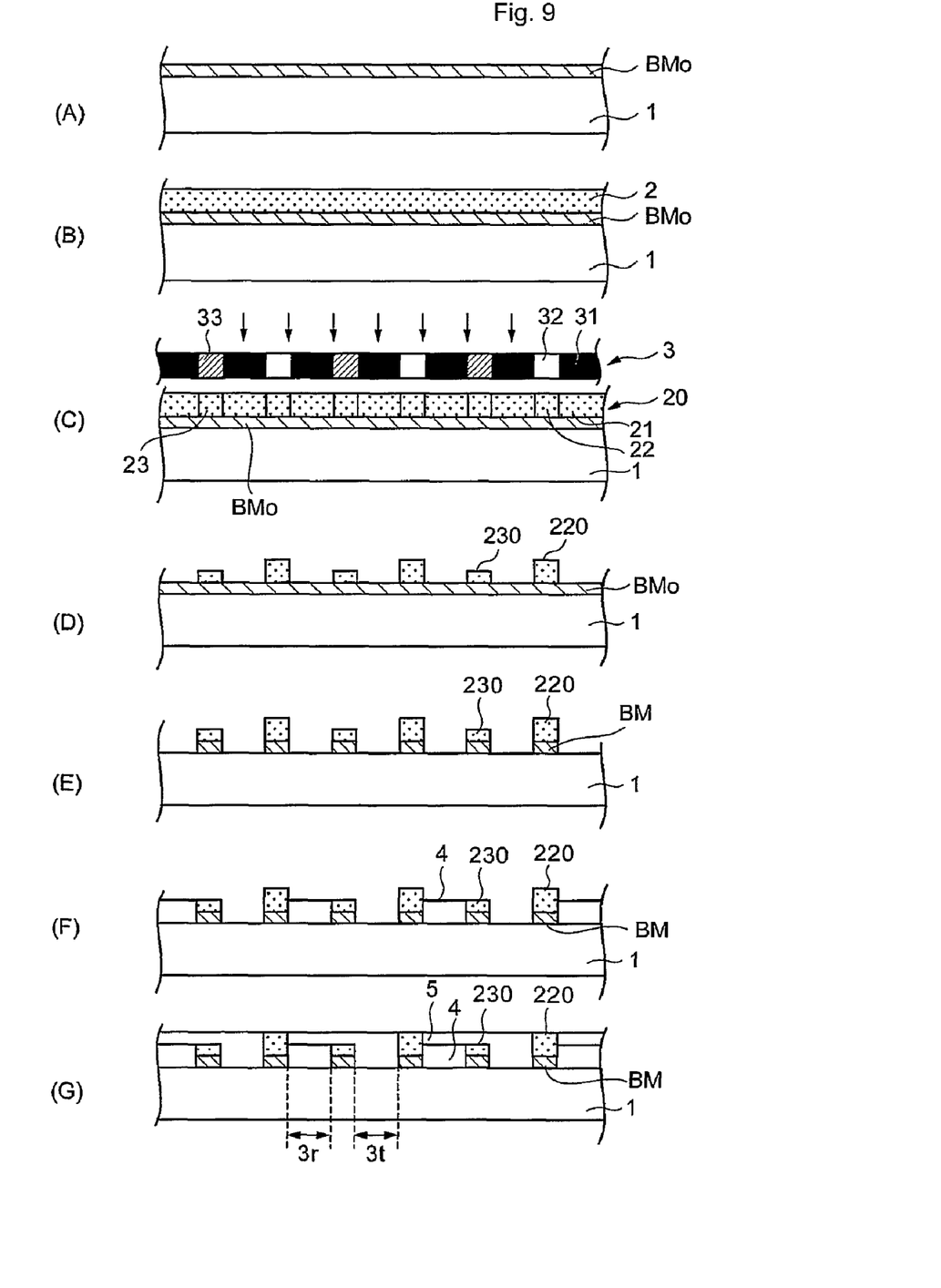
FIG. 9 is a cross sectional views generally showing structures of a color filter in steps of a color filter manufacturing method according to the other embodiment of the invention.

Next, a material 2 for forming a step-forming layer is deposited on the material BMo (FIG. 9(B)). The material 2 is not restricted to a light shield material and may be an optical transmissive material, but a kind of material suitable for a photolithography method or a color resist method is selected.

Then, a photomask 3 is overlaid on the substrate from above the material 2, an exposure process is applied (FIG. 9(C)), a developing process is carried out as in the case of the foregoing embodiment, and ribs 220, 230 as shown in (D) of FIG. 9 are patterned.

After the ribs 220, 230 are formed, an etching process using a predetermined etchant is applied to the material BMo using the patterns of the ribs 220, 230 as a mask. By this process, only the material BMo right below the ribs 220, 230 remains as shown in (E) of FIG. 9 and a black matrix BM having a desired light shield effect is patterned under the ribs 220, 230. It goes without saying that the material 2 is required to be corrosion-resistant to the etchant used here.

After this, as shown in (F), (G) of FIG. 9 as in the case of Embodiment 1, processes of forming a step-forming layer and a coloring layer are carried out in an ink-jet method.

According to this embodiment, the step of forming the black matrix BM is added, but there is an advantageous aspect in that a relatively plain material can be used for the black matrix and ribs. Moreover, this added step also makes full use of the ribs 220, 230 as an etching mask, and therefore it is possible to minimize an increase in manufacturing burden.

Embodiment 3

Next, a further embodiment of the present invention will be described with reference to FIG. 10.

Also in this manufacturing method, a glass substrate 1 is prepared first and carry out necessary processes such as cleaning, but in this embodiment, a material 2' for forming a partition layer (step-forming layer) based on a transparent or optical transmissive material instead of a black matrix is deposited on the glass substrate 1. This situation is shown in FIG. 10(A). The glass substrate 1 can be replaced by a transparent or optical transmissive synthetic resin substrate, etc. As the material 2', a type of material suitable for a photolithography method to which the manufacturing method of this embodiment belongs or color resist method is selected, and a color resist which keeps transparency even after the process is over. More specifically, acrylic base optical transmissive photosensitive resin can be used, for example. The material 2' is deposited onto the substrate 1 in the same way as for the aforementioned material 2.

Thereafter, a photomask 3' is overlaid on the substrate from above the material 2' and an exposure process is carried out. (B) of FIG. 10 shows this situation. The photomask 3' is also divided into three kinds of parts; completely light-shield part 31', completely light transmissive part 32' and intermediately light transmissive part 33'. When an exposure process is performed using this photomask 3', the corresponding parts 21', 22' and 23' are formed in the material 2'.

Figure 10:
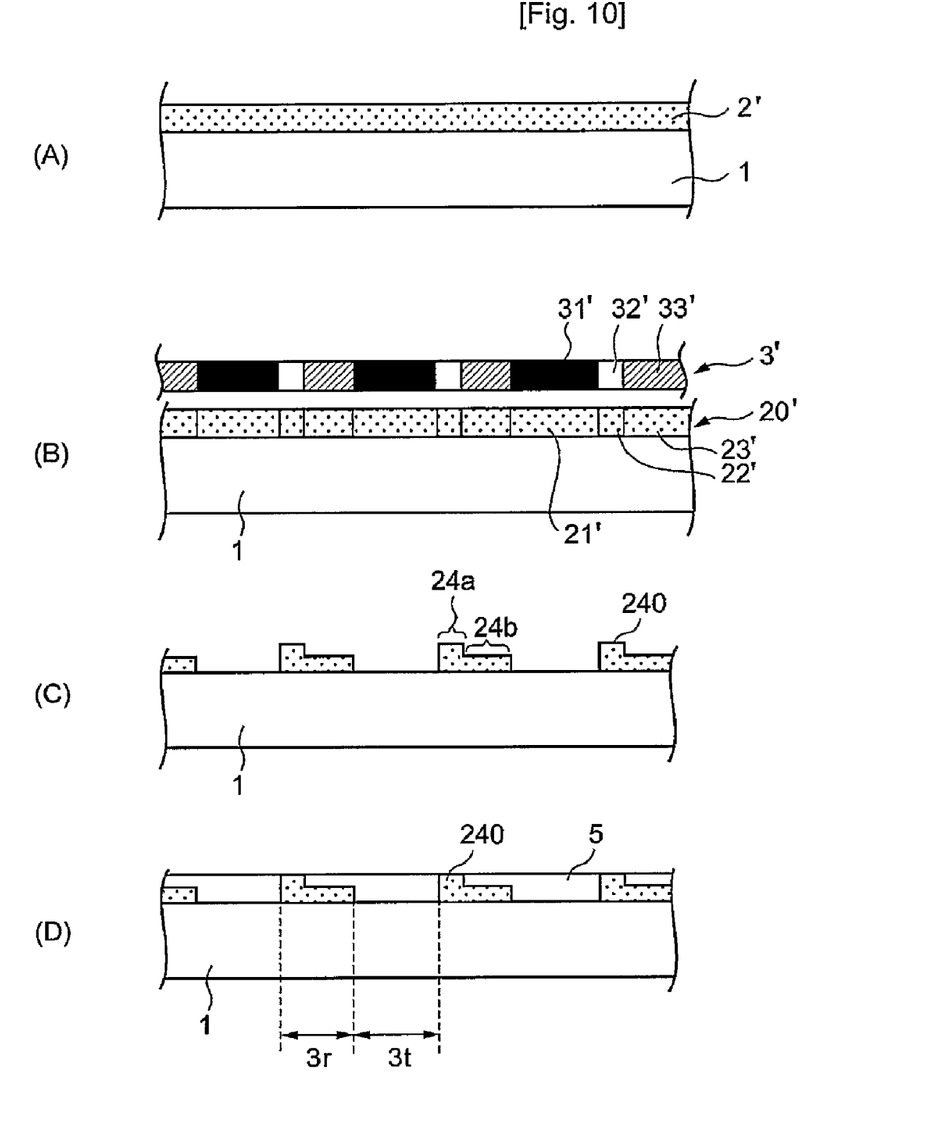
FIG. 10 is a cross sectional views generally showing structures of a color filter in steps of a color filter manufacturing method according to a further embodiment of the invention.
Figure 11:
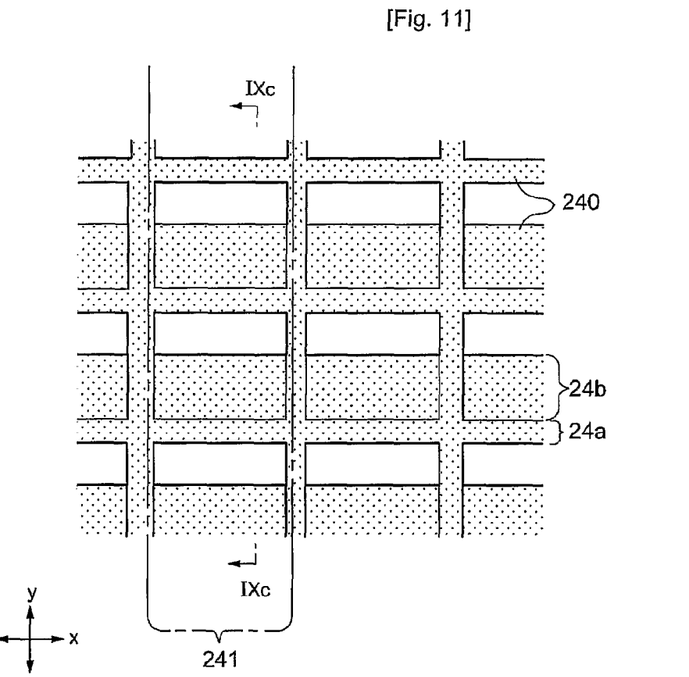
FIG. 11 is a schematic plan view of the color filter in the step of (C) of FIG. 10.

Then, when a developing process is carried out in the same way as in the foregoing embodiment, a rib 240 formed of the material 2' and having two types of height is patterned as shown in (C) of FIG. 10. A plan view corresponding to this figure (C) is shown in FIG. 11.

As has already been described, the material 2' is a material which keeps optical transmissiveness, and therefore this rib 240 does not form any black matrix. However, as shown in FIG. 11, a pixel area is defined by the highest portion 24a of this rib and a step in the pixel area is defined by the portion 24b of intermediate height. In this example, the intermediate portion of the rib 240 is patterned in such a way as to level up the lower half of each pixel area.

Figure 12:
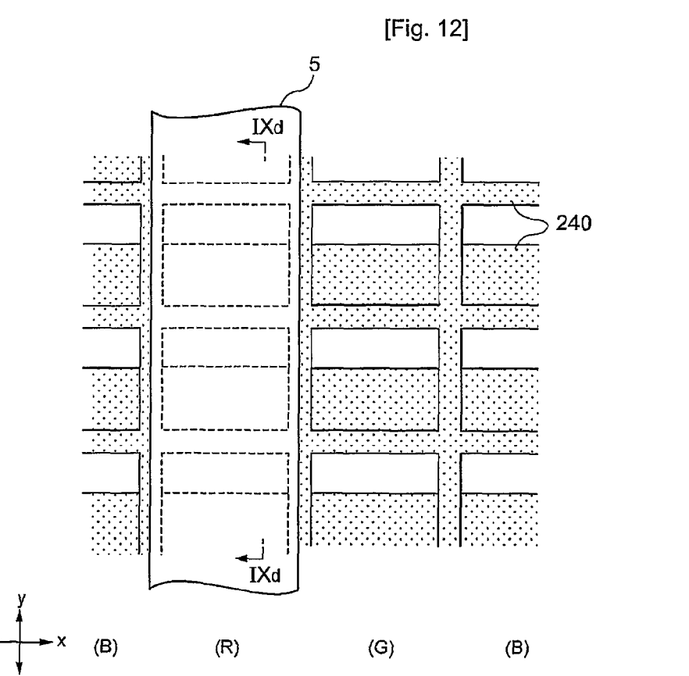
FIG. 12 is a schematic plan view of the color filter in the step of (D) of FIG. 10.

After forming the transparent rib 240, the process goes to a step in the final stage as shown in (D) of FIG. 10 and a process of forming a coloring layer in an ink-jet method is performed. This process is carried out by jetting an optical coloring liquid ink material 5 of any one of R, G, B for forming the coloring layer from the ink-jet head and dripping it into an area defined by the portion of the maximum height of the rib 240. More specifically, the jetting outlet of the ink-jet head is made to face a rectilinear longitudinal area (column area) 241 formed by the respective areas defined by the portions of the maximum height of the ribs 240, the areas lining up in the vertical direction as shown by a single-dot dashed line in FIG. 11, and the ink material 5 is jetted out while the head is being moved along a longitudinal extending direction (vertical direction in FIG. 11) y of the column area and the ink material 5 is continuously dripped into the column area so as to draw a straight line, for example, from top to bottom. FIG. 12 shows a situation in which the ink material 5 of red color (R) is dripped into one of the column areas 241, wherein the ink material 5 is formed rectilinearly so as to overlap with the horizontally extending portion of the rib 240 and skip this portion sequentially to fill the pixel area with the material 5. After the dripping of the ink material 5, thermal treatment for stabilization is performed in the same way as for the ink material 4 in Embodiment 1.

By applying the above-described ink-jet process and thermal treatment of the ink material 5 for each color of R, G, B using a material corresponding to the color to be processed as the ink material 5, it is possible to complete all the coloring layer using the ink material 5. It is also possible to form a transparent protective layer on the coloring layer with respect to the structure shown in (D) of FIG. 10 to cover the layer. This makes it possible to obtain a stronger and more reliable color filter. The problem of the ink material 5 sticking out of the rib in this embodiment can also be handled in the same way as described in Embodiment 1.

This embodiment has an advantage of simplifying manufacturing of a so-called black-matrix-less color filter. Compared to Embodiment 1, the process of forming the ink material 4 is even omitted and only a single process based on ink-jet is needed. When the color filter with no black matrix is used, it is possible to form a black matrix or a structure having a function equivalent to the black matrix in other components of the panel assembly as required.

In this embodiment, the first and second parts 24a, 24b are formed of the same material in the same process using the halftone mask 3, but it is also possible to carry out steps for each part using a photolithography method and form the respective parts independently. Such a manner can also produce advantages specific to the present invention in the sense that the coloring layer 5 can be simply formed in an ink-jet technique without requiring any photomask.

As is evident from the above explanations, the embodiments of the present invention merge the patterning process in a photolithography method with the patterning process in an ink-jet technique, and can thereby simplify the overall manufacturing process. The embodiments also allow manufacturing of a color filter with high forming accuracy even using a current ink-jet technique which has still low accuracy for fine processing (or requires extremely costly equipment, etc.).

The above-described embodiments have been described about the color filter used for a liquid crystal display device, but the present invention is not limited to this, and it goes without saying that the present color filter can also be applied to any display device as long as the display device can use the color filter described here. Furthermore, it is obvious that it is possible to obtain a black-matrix-less type color filter similar to that in Embodiment 3 by adopting optical transmissive ribs instead of light shield type ribs for the ribs 220, 230 in Embodiment 1. Furthermore, an example of an R, G, B striped color filter has been explained above, but the present invention is not limited to this and the present invention is also applicable to other styles such as a mosaic arrangement. Furthermore, the photosensitive resin material used for the ribs has been of a so-called positive type, but it goes without saying that it can be of a negative type.

Representative embodiments of the present invention have been described so far, but the present invention is not limited to these embodiments and those skilled in the art can find various modifications within the scope of the attached claims.

LIST OF REFERENCE NUMERALS

1 . . . glass substrate
2 . . . black matrix material
220, 230 . . . rib
3 . . . photomask
4 . . . transparent ink material
5 . . . coloring ink material
6 . . . ink-jet head
7 . . . ink-jetting control circuit
8 . . . head-tilt control circuit
9 . . . head-slide control circuit
100 . . . opposed substrate
200 . . . pixel electrode
2t . . . transparent electrode part
2r . . . reflective electrode part
3P . . . pixel area
3t . . . transmissive area
3r . . . reflective area
3rt . . . transition area
BM . . . black matrix

The invention claimed is:

1. A color filter comprising:
an optically transmissive base layer;
a first part and a second part provided on the base layer in pattern, the first part forming a pixel boundary, the second part having a smaller height than the first part, wherein the first part is a first rib and the second part is a second rib provided on the base layer in pattern, the second rib having a smaller height than the first rib;
an optically transmissive step-forming layer formed in an area defined by the first and second ribs;
a coloring layer formed in an area defined by the first rib; and
corresponding light shield layers formed under the first and second ribs.

2. A liquid crystal display device, comprising:
the color filter of claim 1 provided on one substrate of the liquid crystal display device; and
a substrate provided with pixel electrodes comprising a transmissive electrode part and a reflective electrode part,
wherein an area of the step-forming layer in the color filter is aligned with the reflective electrode part and another area in the color filter is aligned with the transmissive electrode part.

3. A color filter comprising:
an optically transmissive base layer;
a first part and a second part provided on the base layer in pattern, the first part forming a pixel boundary, the second part having a smaller height than the first part, wherein the first and second parts are made of same material;
an optically transmissive step-forming layer formed in an area defined by the first and second parts; and
a coloring layer formed in an area defined by the first part, wherein the coloring layer covers a top surface of the second part.

4. A liquid crystal display device, comprising:
the color filter of claim 3 provided on one substrate of the liquid crystal display device; and
a substrate provided with pixel electrodes comprising a transmissive electrode part and a reflective electrode part,
wherein an area of the step-forming layer in the color filter is aligned with the reflective electrode part and another area in the color filter is aligned with the transmissive electrode part.

5. A color filter as defined in claim 3, wherein the material of the first and second parts comprises a photosensitive material.

6. A color filter as defined in claim 3, wherein the material of the first and second parts comprises a photoresist material.

7. A color filter as defined in claim 6, wherein the photoresist material is a color resist material.

8. A color filter as defined in claim 3, wherein a first region and a second region are defined on either side of the second part within the area defined by the first part, wherein the first region is defined between the first part and a first side of the second part, and the second region is defined between the first part and a second side of the second part, and wherein the first region corresponds to the area defined by the first and second parts.

9. A color filter as defined in claim 8, wherein the optically transmissive step-forming layer comprises a transparent material formed in the first region.

10. A color filter as defined in claim 9, wherein the coloring layer extends to cover the transparent material in the first region, the second part and the second region within the area defined by the first part.

11. A color filter as defined in claim 10, wherein the first part is a first rib and the second part is a second rib provided on the base layer in pattern.

12. A color filter as defined in claim 3, wherein the first and second parts are contiguous.

13. A color filter as defined in claim 3, wherein corresponding light shield layers are formed under the first and second parts.

14. A color filter comprising:

a base layer;

a first part and a second part provided on the base layer in pattern, wherein:

the second part having a smaller height than the first portion, the first part defines an area having the second part therein, a first region and a second region are defined on either side of the second part within the area defined by the first part, wherein the first region is defined between the first part and a first side of the second part, and the second region is defined between the first part and a second side of the second part;

an optically transmissive step-forming layer formed in the first region; and a coloring layer formed in the area defined by the first part, wherein the coloring layer covers a top surface of the second part.

15. A liquid crystal display device, comprising:

the color filter of claim 14 provided on one substrate of the liquid crystal display device; and a substrate provided with pixel electrodes comprising a transmissive electrode part and a reflective electrode part, wherein an area of the step-forming layer in the color filter is aligned with the reflective electrode part and another area in the color filter is aligned with the transmissive electrode part.

16. A color filter as defined in claim 14, wherein the optically transmissive step-forming layer comprises a transparent material formed in the first region.

17. A color filter as defined in claim 16, wherein the coloring layer extends to cover the transparent material in the first region, the second part and the second region within the area defined by the first part.

18. A color filter as defined in claim 14, wherein the first part is a first rib and the second part is a second rib provided on the base layer in pattern.

19. A color filter as defined in claim 14, wherein the first and second parts are contiguous.

20. A color filter as defined in claim 14, wherein the first and second parts are made of same material.

* * * * *